(12) United States Patent
Brown et al.

(10) Patent No.: US 10,766,393 B1
(45) Date of Patent: Sep. 8, 2020

(54) NET STYLE CUP HOLDER ASSEMBLIES FOR SEAT ASSEMBLIES

(71) Applicant: Toyota Motor Engineering & Manufacturing North America, Inc., Plano, TX (US)

(72) Inventors: Shelby L. Brown, Brighton, MI (US); Lindsay A. Babian, Canton, MI (US); Hamshivraj Dhamrat, Saline, MI (US); Robert J. Hazlewood, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/431,087

(22) Filed: Jun. 4, 2019

(51) Int. Cl.
*B60N 3/10* (2006.01)
*B60R 7/00* (2006.01)

(52) U.S. Cl.
CPC .............. *B60N 3/102* (2013.01); *B60R 7/005* (2013.01)

(58) Field of Classification Search
CPC .......... B60N 3/10; B60N 3/101; B60N 3/105; B60N 3/108; B60N 3/102; B60N 7/005
See application file for complete search history.

(56) References Cited

U.S. PATENT DOCUMENTS

| | | | |
|---|---|---|---|
| 3,429,542 A * | 2/1969 | Fagan | A62C 13/78 248/313 |
| 6,264,154 B1 | 7/2001 | Hiscox et al. | |
| 6,471,276 B1 * | 10/2002 | Brunsman | B29C 45/14073 264/257 |
| 6,619,738 B1 * | 9/2003 | Filipovich | B60N 3/08 297/188.16 |
| 7,104,580 B2 * | 9/2006 | Clark | B60N 3/101 296/24.32 |
| 7,997,635 B2 * | 8/2011 | Ercolano | B60R 7/005 296/37.1 |
| 8,052,190 B2 * | 11/2011 | Vander Sluis | B60R 7/04 224/282 |
| 8,066,148 B2 * | 11/2011 | Garahan | A45F 5/02 220/737 |
| 8,807,408 B2 | 8/2014 | Kreis | |
| 8,905,456 B2 * | 12/2014 | Gaudig | B60N 3/108 296/1.07 |
| 9,616,817 B2 * | 4/2017 | Dyle | B60R 7/046 |

(Continued)

FOREIGN PATENT DOCUMENTS

| | | |
|---|---|---|
| DE | 10303987 A1 | 8/2004 |
| KR | 970038705 A | 7/1997 |
| KR | 200130980 Y1 | 6/1999 |

*Primary Examiner* — Philip F Gabler
(74) *Attorney, Agent, or Firm* — Dinsmore & Shohl LLP (57) ABSTRACT

A cup holder assembly for a seat assembly of a vehicle includes a side shield and a net. The side shield includes an inner surface, an outer surface, a curved indentation wall extending from the outer surface, and a bottom wall. The net has an upper edge, a lower edge, and a pair of side edges. The lower edge has a length less than a length of the upper edge. The lower edge and the pair of side edges of the net engage with the outer surface of the side shield to bound at least a portion of the curved indentation wall. The net includes an apex that extends outwardly beyond the outer surface such that the net is configured to retain an object within the cup holder assembly.

12 Claims, 5 Drawing Sheets

(56) References Cited

U.S. PATENT DOCUMENTS

| | | | |
|---|---|---|---|
| 10,000,158 B2 * | 6/2018 | Darrow | A45C 3/00 |
| 2002/0145096 A1 * | 10/2002 | Eubanks | A47G 23/0225 |
| | | | 248/311.2 |
| 2004/0010891 A1 * | 1/2004 | Byers, Jr. | B65D 33/30 |
| | | | 24/30.5 R |
| 2018/0201196 A1 | 7/2018 | Hellman et al. | |
| 2019/0283644 A1 * | 9/2019 | Smith | B64D 11/0638 |

* cited by examiner

NET STYLE CUP HOLDER ASSEMBLIES FOR SEAT ASSEMBLIES

TECHNICAL FIELD

The present specification generally relates to seat assemblies for a vehicle and, more specifically, seat assemblies that include a net style cup holder assembly.

BACKGROUND

In vehicles having seat assemblies positioned on either side of a walkway, storage containers installed on side shields of the seat assemblies interfere with the walkway. As the storage containers are provided on the side shields of the seat assembly, the storage containers extend into the walkway thereby reducing a space between the seat assemblies that defines the walkway. The decrease in walkway space may decrease consumer satisfaction due to the difficulty of traversing the narrowed walkway.

Accordingly, a need exists for alternative seat assemblies that provide for net style cup holder assemblies that does not encroach on or impede upon the walkway space between the seat assemblies of the vehicle.

SUMMARY

In accordance with one embodiment, a cup holder assembly for a seat assembly of a vehicle is provided. The seat assembly includes a seat cushion and a seat back. The cup holder assembly includes a side shield and a net. The side shield is configured to be coupled to the seat cushion. The side shield includes an inner surface, an outer surface, a curved indentation wall extending from the outer surface, and a bottom wall. The net has an upper edge, a lower edge, and a pair of side edges. The lower edge has a length less than a length of the upper edge. The lower edge and the pair of side edges of the net engage with the outer surface of the side shield to bound at least a portion of the curved indentation wall. The net includes an apex that extends outwardly beyond the outer surface such that the net is configured to retain an object within the cup holder assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a passenger compartment having a plurality of seat assemblies such as a second row of seat assemblies and a third row of seat assemblies positioned rearward of the second row of seat assemblies. A walkway space is positioned between the second row of seat assemblies to allow a user to access the third row of seat assemblies. It is appreciated that the net-style cup holder assembly is not limited to the second row seat assemblies and may be provided on the third row seat assemblies, the front driver seat, and the front passenger seat.

The seat assembly includes a seat cushion, seat back, and a cup holder assembly configured to minimize the amount of space impeding into the walkway space. Specifically, a receptacle of the cup holder assembly is defined by a curved indentation wall extending from an outer surface of the side shield, a bottom wall, and a net. The net is attached to the outer surface of the side shield. The net includes an upper edge, a lower edge, and a pair of angled side edges such that the lower edge has a length less than a length of the upper edge. The net bounds at least a portion of a peripheral of the curved indentation wall. The net includes an apex that extends outwardly beyond the outer surface of the side shield to allow for easier insertion of an object into the receptacle that is configured to retain an object within the cup holder assembly. The net may collapse inwardly from the outer surface towards the curved indentation wall when an object is not present within the receptacle. The cup holder assembly provides for minimizing the amount of space impeding into the walkway space regardless of whether the object is within the cup holder or storage area.

Figure 1:
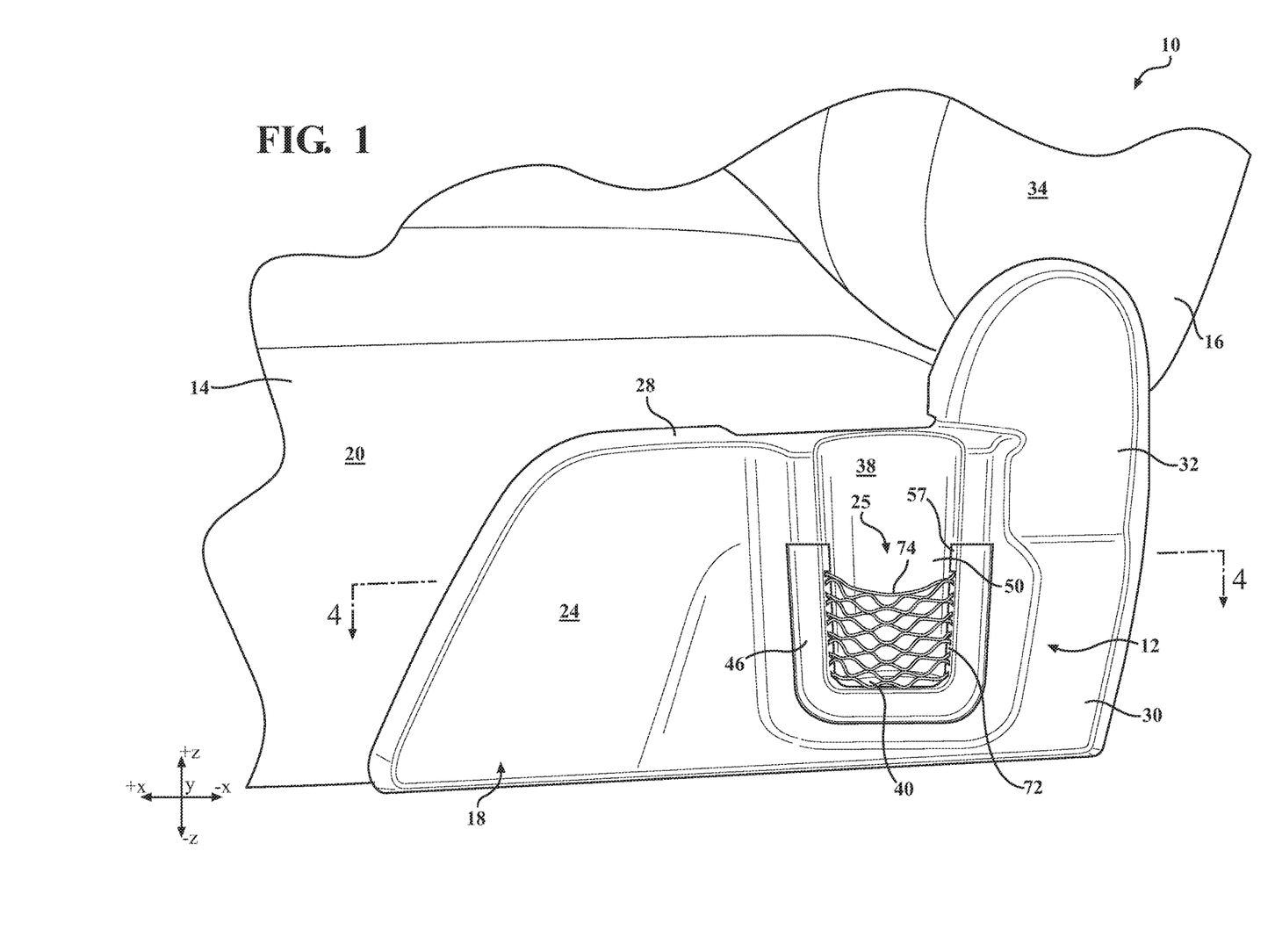
FIG. 1 schematically depicts a partial side view of a seat assembly that includes a cup holder assembly, according to one or more embodiments shown and described herein.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). As used herein, "upper", "top" and "above" are defined as the positive Y direction of the coordinate axis shown in the drawings. "Lower", "bottom", and "below" are defined as the negative Y direction of the coordinate axis shown in the drawings.

Referring now to the drawings, FIG. 1 schematically depicts a partial side view of a seat assembly 10 that includes a cup holder assembly 12. The seat assembly 10 further includes a seat cushion 14 and a seat back 16. The seat back 16 is pivotally connected to the seat cushion 14. The seat cushion 14 and the seat back 16 are generally comprised of a cushion or cushion like foam material to provide comfort to the user. The seat cushion 14 may be provided over a wire frame to provide structure to the seat. The seat assembly 10 is attached to a frame, which is mounted to a vehicle floor.

In some embodiments, the seat assembly 10 is slidably mounted to the vehicle floor by a track mechanism. The track mechanism may include a pair of rails configured for mounting to the vehicle floor. The seat assembly 10 may include a seat cushion 14 and a seat back 16. The seat cushion 14 may have a frame that is configured to engage with the pair of rails such that the seat cushion 14 moves or slides across the rails.

Figure 2:
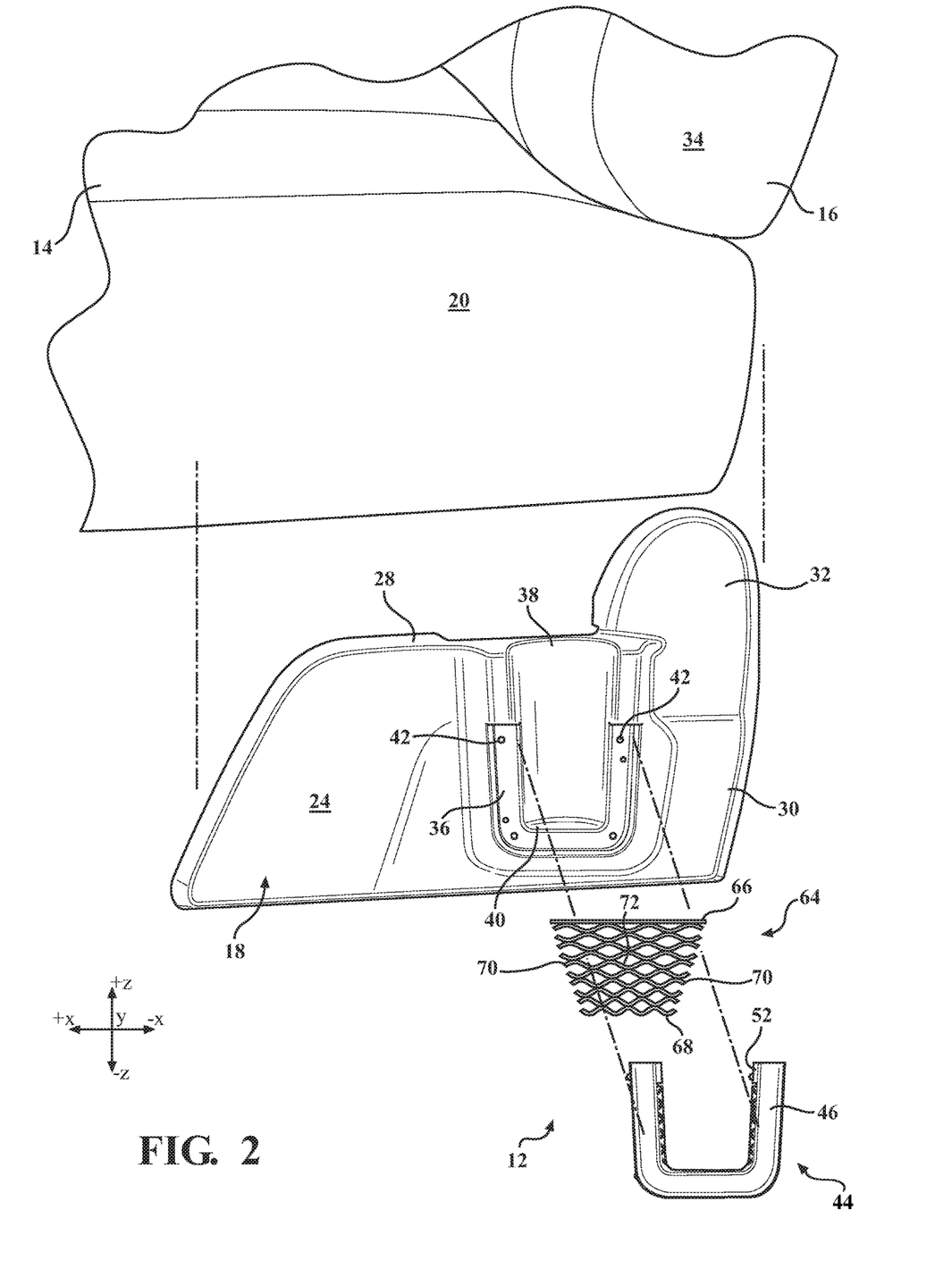
FIG. 2 schematically depicts an exploded view of the seat assembly of FIG. 1, according to one or more embodiments shown and described herein.
Figure 4:
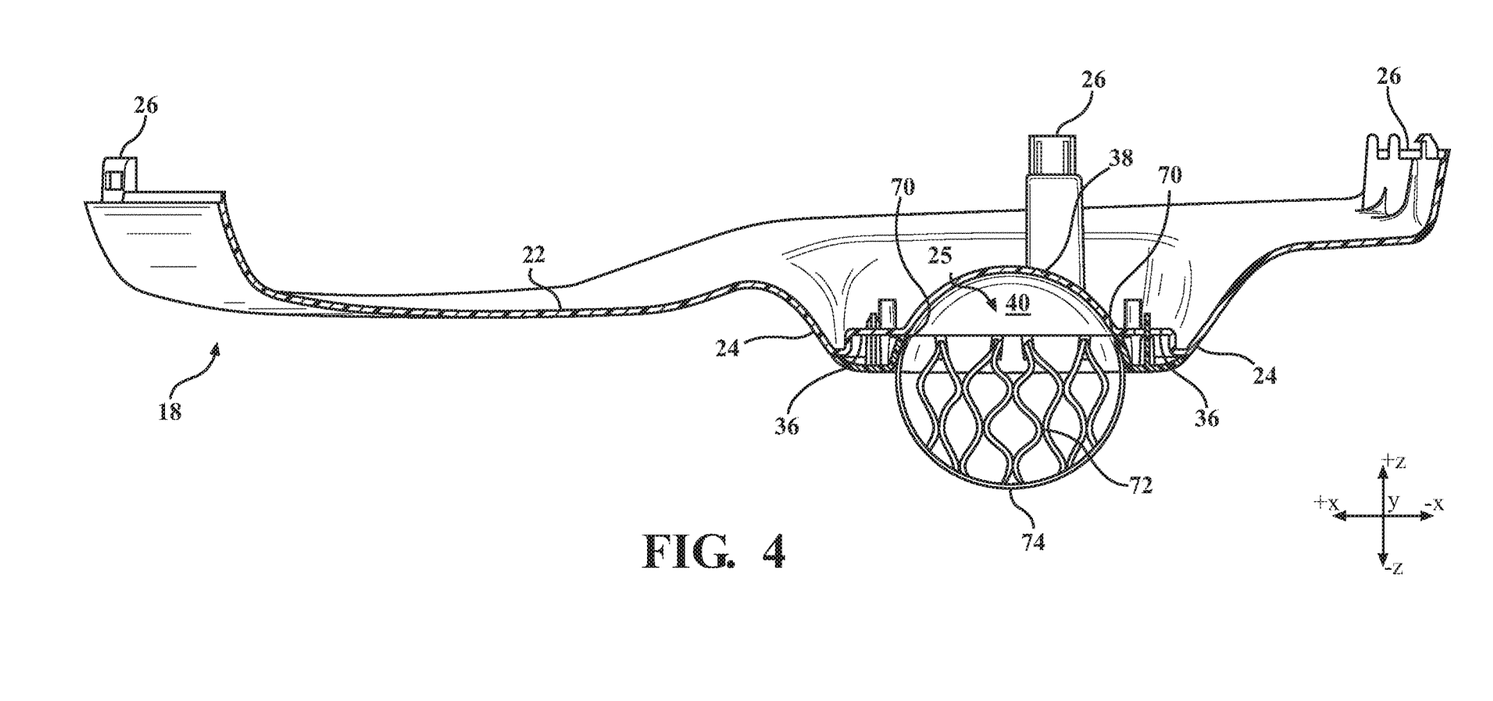
FIG. 4 schematically depicts a partial cross sectional view taken from line 4-4 of the seat assembly of FIG. 1, according to one or more embodiments shown and described herein.

Referring to FIGS. 1-2 and 4, the seat cushion 14 includes an outer side 20. A side shield 18 is attached to at least a portion of the outer side 20 of the seat cushion 14. The side shield 18 is configured to provide an aesthetically appealing appearance to users by mating with the seat cushion 14 and seat back 16 such that any gaps between a seat cushion frame, a seat assembly mounting hardware, and a recliner mechanism that permits the seat back 16 to pivot with respect to the seat cushion 14 are covered.

The side shield 18 is provided having an inner surface 22 that faces the outer side 20 and an opposite outer surface 24. As best seen in FIG. 4, the side shield 18 is coupled to the seat cushion 14 by a plurality of fasteners 26 such as mounting clips, press tabs, and the like disposed along the inner surface 22 of the side shield 18. It is appreciated that the side shield 18 may be coupled to the seat back 16 or the frame of the seat assembly 10.

The side shield 18 includes an upper edge 28, which extends a length of the side shield 18. In some embodiments, the side shield 18 may further include a rear portion 30 and may include an upper portion 32. The upper portion 32 raises in the vehicle vertical direction (i.e., the +/−Z direction) along an outside surface 34 of the seat back 16. The outer surface 24 of the side shield 18 is generally planar, contoured and styled and generally extends at least a portion of the seat cushion 14.

Still referring to FIGS. 1-2 and 4, the cup holder assembly 12 will be discussed. The cup holder assembly 12 includes the side shield 18, a U-shaped bezel 44, and a net 64. The outer surface 24 of the side shield 18 may include a U-shaped groove 36 recessed within a portion of the outer surface 24 of the side shield 18, a curved indentation wall 38, and a bottom wall 40. The net 64, the curved indentation wall 38, and the bottom wall 40 define a receptacle 25 configured to receive and retain an object. The curved indentation wall 38 extends from the outer surface 24 of the side shield 18 towards the inner surface 22 of the side shield 18. The bottom wall 40 extends in a vehicle lateral direction (i.e. in the +/−Y-direction) from the curved indentation wall 38 towards the outer surface 24 of the side shield 18 without extending beyond the outer surface 24 of the side shield 18.

Still referring to FIGS. 1-2 and 4, the curved indentation wall 38, as best seen in FIG. 4, may have a generally semi-cylindrical shape having an opening at the outer surface 24 and extending outwardly in the vehicle lateral direction (i.e., in the −Y direction). In some embodiments, the upper edge 28 of the side shield 18 is reduced such that there is clearance for the curved indentation wall 38 such that the curved indentation wall 38 does not protrude beyond the outer surface 24 of the side shield 18. In other embodiments, the outer surface 24 of the side shield 18 curves outwardly in the vehicle lateral direction (i.e. in the +Y-direction) to provide clearance for the curved indentation wall 38 such that the curved indentation wall 38 does not protrude beyond the outer surface 24 of the side shield 18. In yet other embodiments, the combination of the upper edge 28 reduction and the curvature of the outer surface 24 of the side shield 18 provides clearance for the curved indentation wall 38 such that the curved indentation wall 38 does not extend beyond the outer surface 24 of the side shield 18, as shown in FIGS. 1-2 and 4.

The curved indentation wall 38 extends a height in the vehicle vertical direction (i.e., in the +/−Z-direction) of the side shield 18 and may be positioned anywhere on the side shield 18. For instance, the curved indentation wall 38 of the cup holder assembly 12 may be more forward or rearward on the side shield 18 in the vehicle longitudinal direction (i.e., in the +/−X-direction) contrary to the position of the curved indentation wall 38 of the cup holder assembly 12 depicted in FIGS. 1-2 and 4.

Referring to FIGS. 2 and 4, the U-shaped groove 36 is recessed within the outer surface 24 of the side shield 18 such that the U-shaped groove 36 peripherally surrounds a portion of the opening of the curved indentation wall 38 and the bottom wall 40. The U-shaped groove 36 includes a plurality of receiving bores 42. In some embodiments, the plurality of receiving bores 42 is disposed along a peripheral of the opening of the curved indentation wall 38. In other embodiments, the plurality of receiving bores 42 may be in the corners, along one side, and the like as appreciated by those skilled in the art.

Figure 3:
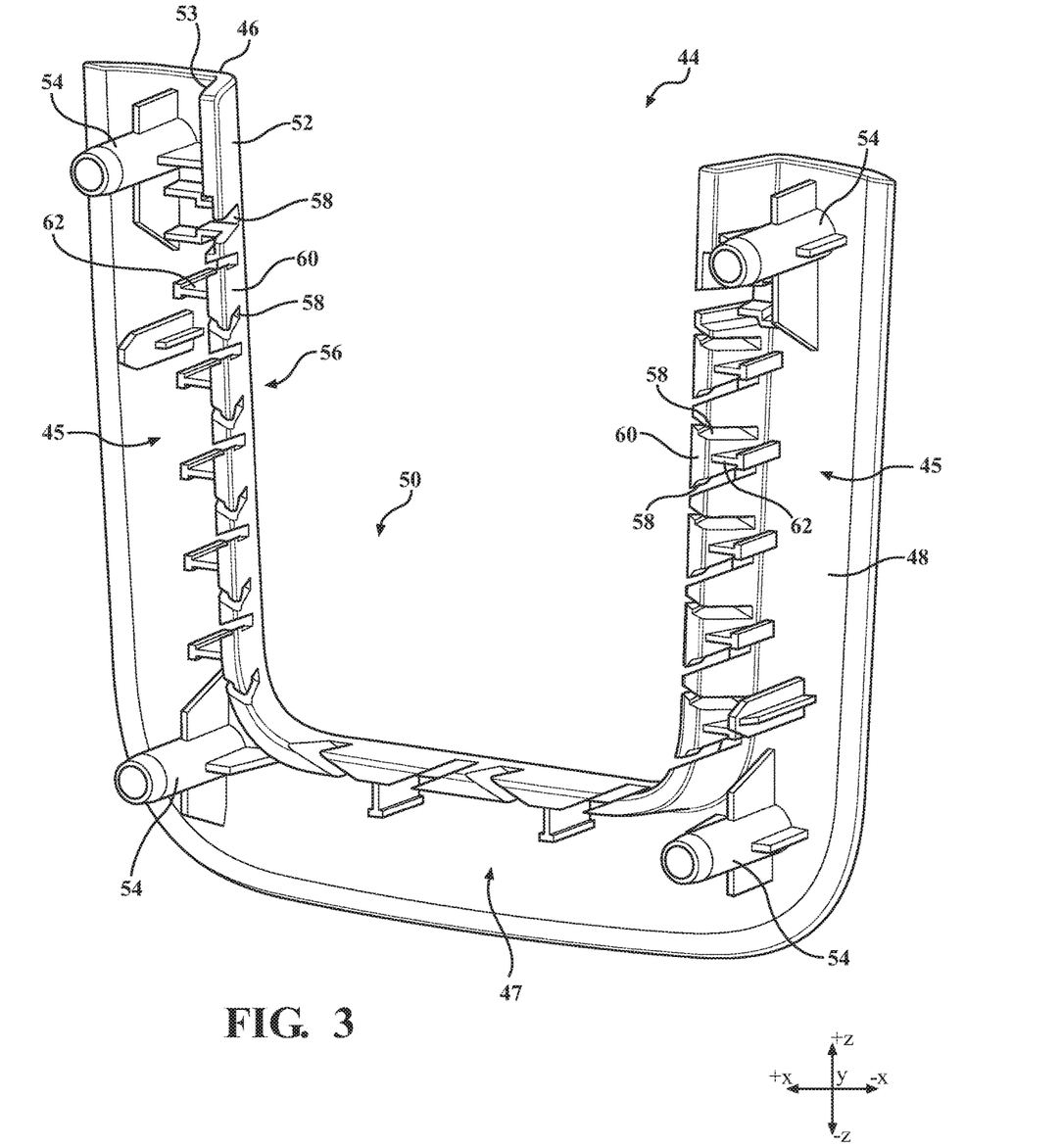
FIG. 3 schematically depicts an isolated perspective view of a bezel of the seat assembly of FIG. 1, according to one or more embodiments shown and described herein.

Now referring to FIG. 3, a schematic isolated perspective view of a U-shaped bezel 44 will be described. The U-shaped bezel 44 includes a pair of sidewalls 45 spaced apart by a bottom edge 47 that forms an opening 50 therebetween. The pair of sidewalls 45 and the bottom edge 47 includes a front surface 46 and a rear surface 48. In some embodiments, the front surface 46 is curved providing for a flange portion 52 that extends into the opening 50. A plurality of engagement members 54 extend from the rear surface 48 of the U-shaped bezel 44. It should be appreciated that the at least one of the plurality of engagement members 54 is a boss configured for heat staking, as discussed in greater detail below. The rear surface 48 of the U-shaped bezel 44 further includes a plurality of net engagement portions 56.

The plurality of net engagement portions 56 bounds a portion of a peripheral of the opening 50 such that when installed, the U-shaped bezel 44 and the net 64 peripherally bounds a portion of the U-shaped groove 36 and/or a portion of the curved indentation wall 38, as described in greater detail herein. Each one of the plurality of net engagement portions 56 includes a plurality of slots 58. In some embodiments, each slot of the plurality of slots 58 is disposed on the flange portion 52 extending in a direction traverse to the front surface 46 of the U-shaped bezel 44. In some embodiments, each slot 58 is offset at an acute angle with respect to the flange portion 52, where each slot 58 converges towards the neighboring slot as each slot extends from the flange portion 52 towards the front surface 46. In other embodiments, the angle is obtuse or a right angle. Further, in some embodiments, a triangular retaining portion 60 is formed between the converging of each of the plurality of slots 58. A t-member 62 or girder may be formed on the inside surface 53 of the flange portion 52. The t-member 62 extends perpendicular to the opening 50. Each slot 58 is configured to receive at least a portion of the net 64 and each t-member 62 is configured to retain at least a portion of the net 64, as discussed in greater detail herein.

Now referring to FIGS. 1-4, the net 64 includes an upper edge 66, a lower edge 68, and a pair of side edges 70. A net body 72 extends between the upper edge 66, the lower edge 68, and the pair of side edges 70. The lower edge 68 has a length less than a length of the upper edge 66. Specifically, a distance of the lower edge 68 between the pair of side edges 70 is less than a distance of the upper edge 66 between the pair of side edges 70. The pair of side edges 70 is angled between the lower edge 68 and the upper edge 66 due to the length of the upper edge 66. Specifically, each of the pair of side edges 70 forms an obtuse angle with the lower edge 68.

In some embodiments, the upper edge 66 of the net 64 includes an elastomeric member incorporated therein. The elastomeric member of the upper edge 66 facilitates a retention of an object within the receptacle 25 of the cup holder assembly 12. Specifically, elastomeric member of the upper edge 66 allows the upper edge 66 to expand to hold objects having a large diameter.

It should be appreciated that in some embodiments the net 64 may be a trapezoid shape. In other embodiments, the net 64 may be an elliptical half, an isosceles trapezoid, a parabolic, and/or the like. The net body 72 may be nylon, polyester, cloth, and/or the like and may have any type of hatching or mesh that can be used as a barrier. In some embodiments, the mesh may have smaller openings and be more flexible for a child's use. In other embodiments, the mesh may have larger openings and be more rigid than the smaller opening meshes such that the mesh may be more suitable for adults. It is appreciated that the net types may be interchangeable, may be based on location of the seat cushion 14 within the vehicle, and/or the like.

Still referring to FIGS. 1-4, each of the plurality of slots 58 may be configured to receive a portion of the net 64. In particular, the slots 58 may receive the side edges 70 and the lower edge 68 of the net. In some embodiments, the slots 58 receive the side edges 70 and lower edge 68. In other embodiments the slots 58 receive portions of the net body 72 (i.e., the mesh portion of the net body 72) adjacent to the pair of side edges 70 and/or the lower edge 68. The t-member 62 may engage with the pair of side edges 70 and the lower edge 68 to retain the net 64.

The configuration of the net 64 (i.e., the longer length of the upper edge 66 relative to the length of the lower edge 68) allows the upper edge 66 of the net 64 to curve in an opposite manner to a curvature of the curved indentation wall 38. As such, the curve of the upper edge 66 and the curvature of the curved indentation wall 38 provides a generally circular opening of the receptacle 25, as best shown in FIG. 4. An apex 74 is formed on the upper edge 66 of the net 64. The curve of the upper edge 66 of the net 64 at the apex 74 is a point of the upper edge 66 that is positioned furthest away from the curved indentation wall 38. Specifically, the apex 74 is a central portion of the upper edge 66 and is positioned farther away from the curved indentation wall 38 than a portion of the net 64 adjacent the lower edge 68. As such, a distance between the net 64 and the curved indentation wall 38 increases moving from the lower edge 68 towards the upper edge 66.

This configuration allows an increased distance between the net 64, specifically the apex 74, from the curved indentation wall 38 such that the user may insert a bottom of the object, such as a bottle, into the receptacle 25 of the cup holder assembly 12 using one hand without requiring the user to pull the upper edge 66 of the net 64, in the vehicle lateral direction, away from the curved indentation wall 38 to insert the object.

It is appreciated that the net 64 is flexible to expand and collapse in the vehicle lateral direction (i.e. in the +/−Y- direction) based on whether an object is placed in the receptacle 25 of the cup holder assembly 12. When an object is not present within the receptacle 25, the net 64, specifically, the upper edge 66 is collapsible inwardly towards the curved indentation wall 38 such that the net 64 does not impede into a walkway between adjacent pairs of seat assemblies 10.

Still referring to FIGS. 1-4, in assembly, the U-shaped bezel 44 is configured to engage with the U-shaped groove 36 such that the U-shaped bezel 44 extends a portion of the U-shaped groove 36. In an installed position, the plurality of engagement members 54 align with and engage with the plurality of receiving bores 42. The net 64 engages with the U-shaped bezel 44, as described above, and is installed between the U-shaped bezel 44 and the U-shaped groove 36, as best illustrated in FIG. 2. As such, the net 64 is securely locked into the U-shaped bezel 44, which is mounted to the side shield 18 to create the cup holder assembly 12 that, when empty, does not encroach the walkway path. Further, when an object, such as a cup or a bottle is placed in the receptacle 25 of the cup holder assembly 12, the encroachment into the walkway is minimized due to the structure of the cup holder assembly 12 as described in detail herein. It should be appreciated that with the net 64 installed in this configuration, in some embodiments, the net 64 forms part of the bottom wall 40 to minimize the encroachment into the walkway.

Figure 5:
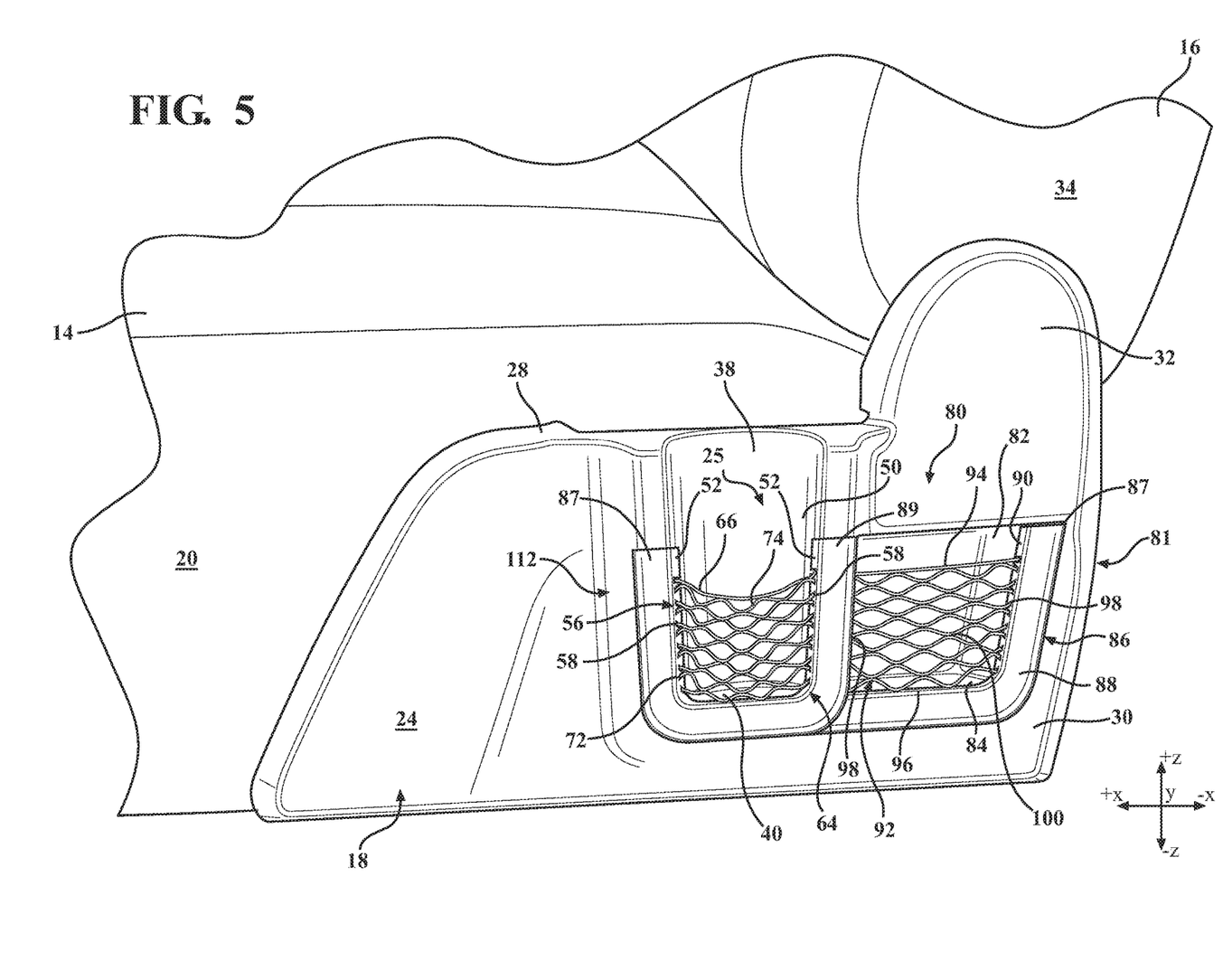
FIG. 5 schematically depicts a partial side view of the seat assembly of FIG. 1 that includes a storage area, according to one or more embodiments shown and described herein.

Turning now to FIG. 5, an embodiment of a cup holder assembly 112 having a storage area 80 defined by a storage assembly 81 will now be described. It should be appreciated that the cup holder assembly 112 is substantially similar to the cup holder assembly 12 with the exception of the storage area 80. As such, like element numbers are used to indicate like elements as discussed above and for brevity reasons, the cup holder assembly 112 description is not repeated. In some embodiments, the storage area 80 is located rearward of the cup holder assembly 112 in the vehicle longitudinal direction (i.e., in the +/−X direction), as shown in the embodiment depicted in FIG. 5. In other embodiments, the storage area 80 may be location forward of the cup holder assembly 112.

The side shield 18 is attached to at least a portion of the outer side 20 of the seat cushion 14. In some embodiments, the rear portion 30 of the side shield 18 may be elongated in the vehicle longitudinal direction (i.e., in the +/−X-direction) to accommodate for the storage area 80. As such, the upper portion 32, the outer surface 24 and/or the upper edge 28 may also be elongated. The outer surface 24 of the side shield 18 is generally planar, contoured and styled and generally extends at least a portion of the seat cushion 14.

Still referring to FIG. 5, the storage area 80 of the cup holder assembly 112 will now be described. The storage area 80 is disposed within the outer surface 24 of the side shield 18. The storage assembly 81 may include a groove (not shown) recessed within the portion of the outer surface 24 of the side shield 18, a storage bezel 86, and a net storage portion 92, as described in more detail herein. In some embodiments, the storage assembly 81 may further include a storage indentation portion 82 and a storage bottom wall 84. In some embodiments the net storage portion 92, the storage bezel 86, and at least a portion of the outer surface 24 of the side shield 18 define the storage area 80. In other embodiments, the storage area 80 is defined by the net storage portion 92, the storage indentation portion 82, the storage bottom wall 84, and the storage bezel 86 define the storage area 80.

Still referring to FIG. 5, the storage bezel 86 may generally be an E-shape having a pair of side edges 87 and an intermediate wall 89 that define the storage area 80 between one of the pair of side edges 87 and the intermediate wall 89 and the curved indentation wall 38 between the other one of the pair of side edges 87 and the intermediate wall 89. It should be appreciated that the storage area 80 is configured to retain at least one article and the cup holder assembly 112 is configured to retain the cup or the bottle, as discussed above. The pair of side edges 87 and the intermediate wall 89 includes a front surface 88 and a rear surface. In some embodiments, the front surface 88 is curved providing for a flange portion 90 that extends into the storage area 80. Similar to the U-shaped bezel 44 (FIG. 3), the storage bezel 86 includes a plurality of engagement members (not shown) that extend from the rear surface of the storage bezel 86 and are configured to attach the storage bezel 86 to the side shield 18. It should be appreciated that the at least one of the plurality of engagement members is a boss configured for heat staking, as discussed in greater detail above. Further, similar to the U-shaped bezel 44 (FIG. 3) the rear surface of the storage bezel 86 further includes a plurality of net engagement portions configured to engage and retain the net 64. The plurality of net engagement portions bounds a portion of a peripheral of the opening 50 and the storage area 80. Each one of the plurality of net engagement portions includes a slot and a t-member, both of which are configured to retain at least a portion of the net 64, as discussed in greater detail herein.

In some embodiments, the storage indentation portion 82 extends from the outer surface 24 of the side shield 18 towards the inner surface 22 (FIG. 4) of the side shield 18. The storage bottom wall 84 extends in a vehicle lateral direction (i.e. in the +/−Y-direction) from the storage indentation portion 82 towards the outer surface 24 of the side shield 18 without extending beyond the outer surface 24. The storage indentation portion 82 may be rectangular, square, or other shape and is open at a top and at the outer surface 24. In some embodiments, the storage bezel 86 generally peripherally surrounds the storage indentation portion 82 and peripherally surrounds a portion of the curved indentation wall 38 of the cup holder assembly 12.

In some embodiments, the storage indentation portion 82 extends rearward in the system lateral direction (i.e., in the −Y direction). Further, in embodiments, the storage indentation portion 82 generally begins at a mid-point of the cup holder assembly 112 and meets or intersects with the storage bottom wall 84 at the height as the bottom wall 40 of the cup holder assembly 112. As such, the storage indentation portion 82 extends a height in the vehicle vertical direction (i.e., in the +/−Z-direction) of the side shield 18 and may be positioned anywhere on the side shield 18. For instance, the storage indentation portion 82 may be more forward or rearward on the side shield 18 in the vehicle longitudinal direction (i.e., in the +/−X-direction) contrary to the position of the storage indentation portion 82 depicted in FIG. 5.

In some embodiments, the bottom wall 40 of the cup holder assembly 112 extends through the storage area 80 such that there is a common bottom wall between the cup holder assembly 12 and the storage area 80. It should be appreciated that similar to the cup holder assembly 12, the storage area 80 is configured such that there is clearance for the storage indentation portion 82 such that the storage indentation portion 82 does not encroach into the walkway or protrude beyond the outer surface 24 of the side shield 18.

Still referring to FIG. 5, the net storage portion 92 includes an upper edge 94, a lower edge 96, and a pair of side edges 98. It should be appreciated that in some embodiments, the net storage portion 92 may be independent from the net 64. As such, each may be a separate net having independent edges, seams, and the like. Further in some embodiments, the net 64 is continuous and the net storage portion 92 share a common intermediate side portion (i.e., one side edge portion of the net 64 in the cup holder assembly 12 is the same one of the pair of side edges 98 of the net storage portion 92). A storage net body 100 extends between the upper edge 94, the lower edge 96, and the pair of side edges 98. It should be appreciated that the net storage portion 92 may generally be a rectangular shape. In other embodiments, the net storage portion 92 may be square, trapezoidal, and the like. The storage net body 100 may be nylon, polyester, cloth, and/or the like and may have any type of hatching or mesh that can be used as a barrier. In some embodiments, the mesh may have smaller openings and be more flexible for a child's use. In other embodiments, the mesh may have larger openings and be more rigid than the smaller opening meshes such that the mesh may be more suitable for adults. It is appreciated that the net types may be interchangeable, may be based on location of the seat cushion within the vehicle, and/or the like. It is also appreciated that the net types between the net 64 and the net storage portion 92 may be the same type or may be different types.

Still referring to FIG. 5, in assembly of the storage assembly 81, the storage bezel 86 is configured to engage with the U-shaped groove 36 the groove, and/or the side shield 18 so to attach the storage bezel 86 to the side shield 18. In the installed position, the net storage portion 92 engages with the storage bezel 86 and is installed between the storage bezel 86 and the U-shaped groove and/or the side shield 18. As such, the net storage portion 92 is securely locked into the storage bezel 86. When the storage area 80 is empty, the storage assembly 81 does not encroach the walkway path. Further, when at least one article, such as a magazine, toy, and/or the like is placed in the storage area 80, the encroachment into the walkway by the storage assembly 81 is minimized due to the structure of the storage assembly 81. It should be appreciated that with the net storage portion 92 installed in this configuration, in some embodiments, the net storage portion 92 forms part of the storage bottom wall 84 to minimize the encroachment into the walkway.

It should now be understood that the cup holder assembly of the side shield includes a curved indentation wall extending from the front surface, a bottom wall and a net that bounds at least a portion of a peripheral of the curved indentation wall, which permits the net of the cup holder assembly extends outwardly from the curved indentation wall and the side shield to retain an object within the cup holder assembly and collapses inwardly towards the curved indentation wall when the net is not holding the object to minimizing the amount of space impeding into the walkway space regardless of whether the object is within the cup holder.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A cup holder assembly for seat assembly of a vehicle, the seat assembly including a seat cushion and a seat back, the cup holder assembly comprising:
    a side shield configured to be coupled to the seat cushion, the side shield includes an inner surface, an outer surface, a curved indentation wall extending from the outer surface, and a bottom wall; and a net having an upper edge, a lower edge, and a pair of side edges, the lower edge having a length less than a length of the upper edge, the lower edge and the pair of side edges of the net engage with the outer surface of the side shield to bound at least a portion of the curved indentation wall, and the net includes an apex that extends outwardly beyond the outer surface such that the net is configured to retain an object within the cup holder assembly.

2. The cup holder assembly of claim 1, wherein the outer surface includes a U-shaped groove.

3. The cup holder assembly of claim 2, further comprising:
a U-shaped bezel having a front surface and an opposite rear surface, the rear surface having a plurality of engagement members and a plurality of net engagement portions,
wherein the U-shaped bezel is mounted to the U-shaped groove through the plurality of engagement members.

4. The cup holder assembly of claim 3 wherein the lower edge and the pair of side edges of the net engage with the U-shaped bezel between the side shield and the front surface of the U-shaped bezel to retain the net.

5. The cup holder assembly of claim 3, wherein the plurality of engagement members are heat staked to the U-shaped groove of the side shield.

6. The cup holder assembly of claim 3, wherein the plurality of net engagement portions are a plurality of slots extending in a direction traverse to the front surface of the U-shaped bezel, the lower edge and the pair of side edges of the net engage within the plurality of slots to attach the net to the U-shaped bezel.

7. The cup holder assembly of claim 1, wherein the curved indentation wall has a generally semi-cylindrical shape.

8. The cup holder assembly of claim 1, wherein the net is configured to collapse such that the apex is configured to be positioned inwardly, in a lateral direction, of the outer surface towards the curved indentation wall.

9. The cup holder assembly of claim 1, wherein each of the pair of side edges are obtusely angled with the lower edge.

10. The cup holder assembly of claim 1, further comprising:
a storage assembly disposed in the side shield and being adjacent to the cup holder assembly;
the net further includes a net storage portion, the net storage portion having an upper edge, a lower edge, and a pair of side edges,
wherein the lower edge and the pair of side edges of the net storage portion engage with the outer surface of the side shield to define a storage area between the net storage portion and the outer surface of the side shield.

11. The cup holder assembly of claim 10, further comprising:
a storage bezel having front surface and a second plurality of net engagement portions,
wherein the storage bezel is mounted to the side shield such that one of the pair of side edges and the lower edge of the net storage portion engage with the storage bezel between the side shield and the front surface of the storage bezel to retain the net storage portion to the side shield.

12. The cup holder assembly of claim 10, wherein the net storage portion is separate from the net of the cup holder assembly.

* * * * *